(12) United States Patent
Cook et al.

(10) Patent No.: US 9,191,796 B2
(45) Date of Patent: Nov. 17, 2015

(54) COMMUNICATION SESSIONS

(71) Applicant: Metaswitch Networks Ltd., Enfield (GB)

(72) Inventors: Alan Cook, San Francisco, CA (US); Jonathan Thomas Rowland, Enfield (GB); Bilen Sahin Ahmet, Enfield (GB)

(73) Assignee: METASWITCH NETWORKS LTD, Enfield (GB)

( * ) Notice: Subject to any disclaimer, the term of this patent is extended or adjusted under 35 U.S.C. 154(b) by 99 days.

(21) Appl. No.: 13/779,187

(22) Filed: Feb. 27, 2013

(65) Prior Publication Data

US 2013/0225135 A1 Aug. 29, 2013

Related U.S. Application Data

(60) Provisional application No. 61/603,868, filed on Feb. 27, 2012.

(51) Int. Cl.
*H04W 4/16* (2009.01)
*H04W 76/02* (2009.01)
*H04L 29/06* (2006.01)

(52) U.S. Cl.
CPC ........... *H04W 4/16* (2013.01); *H04L 29/06278* (2013.01); *H04L 29/06326* (2013.01); *H04L 29/0621* (2013.01); *H04L 29/06197* (2013.01); *H04W 76/02* (2013.01)

(58) Field of Classification Search
CPC .. H04W 4/16; H04W 76/02; H04L 29/06278; H04L 29/06197

USPC ........................ 455/414.1, 415, 413, 417, 445
See application file for complete search history.

(56) References Cited

U.S. PATENT DOCUMENTS

| | | | |
|---|---|---|---|
| 2004/0196826 A1* | 10/2004 | Bao et al. | 370/352 |
| 2008/0002609 A1* | 1/2008 | Caldwell et al. | 370/328 |
| 2009/0196268 A1 | 8/2009 | Caldwell et al. | |
| 2010/0046732 A1* | 2/2010 | James et al. | 379/211.01 |

FOREIGN PATENT DOCUMENTS

WO 2009/095832 A1 8/2009

\* cited by examiner

*Primary Examiner* — Khai M Nguyen
(74) *Attorney, Agent, or Firm* — EIP US LLP

(57) ABSTRACT

A method of initiating a voice call via a dialler user interface on a user device in a telecommunications network is provided. The user device comprises at least a first communication client adapted to communicate via a first part of the telecommunications network and a second communication client adapted to communicate via a second, different part of the telecommunications network. The method includes, at the user device, receiving, via the dialler user interface of the user device, user input from a user of the device associated with initiating setup of a communication session, and selecting a given one of the first and second communication clients to pass the user input to for processing, whereby a communication session setup request is transmitted from the given communication client into the respective part of the telecommunications network.

22 Claims, 6 Drawing Sheets

COMMUNICATION SESSIONS

CROSS-REFERENCE TO RELATED APPLICATIONS

This application claims priority to U.S. Patent Application Ser. No. 61/603,868, entitled "Communication Sessions," filed on Feb. 27, 2012, the content of which is incorporated herein by reference in its entirety.

TECHNICAL FIELD

The present invention relates to communication sessions. In particular, but not exclusively, the present invention relates to initiating voice calls via a dialler user interface on a user device in a telecommunications network and operating a user device in a telecommunications network.

BACKGROUND

Telephony users have long had to deal with a proliferation of user devices (sometimes referred to as 'user equipment' or 'endpoints') through which third parties may contact them. For example, a user might have a fixed-line (or 'wireline') telephony user device for use at home, a further fixed-line telephony user device for use in the office, and a mobile telephony user device for use whilst on the move. Each type of telephony device has associated advantages; whilst a mobile telephony device provides the user with mobility, a fixed-line telephony device typically provides more reliable and higher quality communications and no battery recharge concerns.

Users may also have a number of different access technologies available through which their user devices may conduct communications. For example, a user device may be equipped with a circuit-switched communication interface and one or more circuit-switched communication clients for conducting communications via suitable circuit-switched networks. Likewise, a user device may also/alternatively be equipped with a packet-switched communication interface and one or more packet-switched communication clients for communicating via suitable packet-switched networks.

A circuit-switched user device may comprise a fixed-line Plain Old Telephone Service (POTS) telephone equipped with a circuit-switched interface and communication client for conducting communications via a Public Switched Telephone Network (PSTN). A circuit-switched user device may comprise a mobile (or 'cellular') telephone equipped with a wireless circuit-switched interface and communication client for conducting communications via a cellular network such as a Global System for Mobile Communications (GSM) network or Code Division Multiple Access (CDMA) network.

More recently, packet-switched user devices have proliferated which may take the form of a fixed-line Internet Protocol (IP) telephone equipped with a fixed-line packet-switched interface and communication client for communicating via an Internet Protocol (IP) network, such as the internet or an IP Private Branch Exchange (IP-PBX). Similarly, a user may conduct communications via a personal computer (PC) equipped with a packet-switched communication client for conducting communications over the internet via a fixed-line internet connection. A mobile packet-switched user device may take the form of a portable computing device, such as a laptop or tablet, equipped with a wireless packet-switched interface and communication client for communicating via an IP network, such as the internet, using a Wi-Fi™ or Bluetooth™ compliant wireless access point. A packet-switched communication client may conduct communications according to an internet telephony protocol, commonly referred to as Voice over Internet Protocol (VoIP), with associated control protocols such as the Session Initiation Protocol (SIP) or H.323.

Increasingly, user devices are available that are equipped with multiple communication interfaces to facilitate communication via multiple access technologies. For example, a modern "smartphone" is typically equipped with a circuit-switched interface for communicating via a cellular telephone network and a packet switched interface for communicating via the internet. Commonly, a smartphone may be equipped with several packet-switched interfaces, for example, a short-range radio interface, e.g. Wi-Fi™ or Bluetooth™ compliant, and/or or via an interface for communication of packet data through a cellular network, such as $3^{rd}$ Generation Partnership Project (3GPP) Long Term Evolution (LTE), LTE-Advanced (LTE-A), High Speed Packet Access (HSPA), Wideband Code Division Multiple Access (W-CDMA) or Mobile WiMax etc. In such cases, a packet-switched communication client may also be deployed for conducting communications via one or more of the available wireless packet-switched interfaces. A suitable packet-switched communication client may be deployed on a user device prior to sale, or could be deployed subsequently through an application distribution portal such as the Apple™ App Store™ or Android™ Market etc.

To avoid confusing calling parties with identifiers such as telephone dialling numbers for each of the various communication clients of a user, a one-telephone dialling number telephony service allows the user to publish a single telephone dialling number on which they can be contacted. Thus, when the single telephone dialling number is called, all of the user's communication clients will ring, preferably simultaneously. The user is then able to answer the call at a user device and communication client of his choosing, via an access technology of his choosing.

When a plurality of communication clients is equipped on a single user device, the communication clients are said to be co-located. For example, a single user device may contain a cellular communication client and a VoIP communication client. With such a user device containing co-located communication clients, it is possible that communication sessions such as voice calls can be completed in a number of situations where a single communication client device would have no service available.

For example in remote areas where there is no Wi-Fi or mobile data connection available, a cellular communication client may still be able to complete calls. Conversely, in areas of weak cellular reception, such as inside a large building, a VoIP communication client (or 'soft client') may still be able to complete a call if there is an accessible Wi-Fi access point available. However, current systems provide a poor user experience in this area, when attempting to initiate an outgoing communication session, requiring the user to potentially fail to initiate a communication session setup attempt via one communication client before manually switching to another communication client to attempt to initiate setup of a communication session. The situation is often worse for incoming communication session setup requests, where the calling party has to manually try each of the other party's communication clients in turn in order to determine their reachability.

It would therefore be desirable to provide improved ways to communicate using devices with multiple co-located communication clients.

SUMMARY

In accordance with first embodiments, there is a method of initiating a voice call via a dialler user interface on a user device in a telecommunications network, the user device comprising at least a first communication client adapted to communicate via a first part of the telecommunications network and a second communication client adapted to communicate via a second, different part of the telecommunications network, the method comprising, at the user device:

receiving, via the dialler user interface of the user device, user input from a user of the device associated with initiating setup of a communication session; and selecting a given one of the first and second communication clients to pass the user input to for processing, whereby a communication session setup request is transmitted from the given communication client into the respective part of the telecommunications network.

In accordance with second embodiments, there is apparatus for use in initiating a voice call via a dialler user interface on a user device in a telecommunications network, the user device comprising at least a first communication client adapted to communicate via a first part of the telecommunications network and a second communication client adapted to communicate via a second, different part of the telecommunications network, the apparatus comprising a processing system adapted to, at the user device:

receive, via the dialler user interface of the user device, user input from a user of the device associated with initiating setup of a communication session; and select a given one of the first and second communication clients to pass the user input to for processing, whereby a communication session setup request is transmitted from the given communication client into the respective part of the telecommunications network.

In accordance with third embodiments, there is a computer program product comprising a non-transitory computer-readable storage medium having computer readable instructions stored thereon, the computer readable instructions being executable by a computerized device to cause the computerized device to perform a method for initiating a voice call via a dialler user interface on a user device in a telecommunications network, the user device comprising at least a first communication client adapted to communicate via a first part of the telecommunications network and a second communication client adapted to communicate via a second, different part of the telecommunications network, the method comprising, at the user device:

receiving, via the dialler user interface of the user device, user input from a user of the device associated with initiating setup of a communication session; and selecting a given one of the first and second communication clients to pass the user input to for processing, whereby a communication session setup request is transmitted from the given communication client into the respective part of the telecommunications network.

In accordance with fourth embodiments, there is a method of operating a user device in a telecommunications network, the user device comprising at least a first communication client adapted to communicate via a first part of the telecommunications network and a second communication client adapted to communicate via a second, different part of the telecommunications network, the method comprising, at the user device:

receiving a first communication session setup request directed to the first communication client;

receiving a second communication session setup request directed to the second communication client;

activating a single alert function to alert a user of the user device of receipt of both of the first and second communication session setup requests;

receiving, via a user interface of the user device, user input from the user of the device associated with acceptance of the setup of a communication session; and selecting a given one of the first and second communication clients to pass the user input to for processing, whereby a communication session is established via the given communication client via the respective part of the telecommunications network.

In accordance with fifth embodiments, there is apparatus for use in operating a user device in a telecommunications network, the user device comprising at least a first communication client adapted to communicate via a first part of the telecommunications network and a second communication client adapted to communicate via a second, different part of the telecommunications network, the apparatus comprising a processing system adapted to, at the user device:

receive a first communication session setup request directed to the first communication client;

receive a second communication session setup request directed to the second communication client;

activate a single alert function to alert a user of the user device of receipt of both of the first and second communication session setup requests;

receive, via a user interface of the user device, user input from the user of the device associated with acceptance of the setup of a communication session; and select a given one of the first and second communication clients to pass the user input to for processing, whereby a communication session is established via the given communication client via the respective part of the telecommunications network.

In accordance with sixth embodiments, there is a computer program product comprising a non-transitory computer-readable storage medium having computer readable instructions stored thereon, the computer readable instructions being executable by a computerized device to cause the computerized device to perform a method for operating a user device in a telecommunications network, the user device comprising at least a first communication client adapted to communicate via a first part of the telecommunications network and a second communication client adapted to communicate via a second, different part of the telecommunications network, the method comprising, at the user device:

receiving a first communication session setup request directed to the first communication client;

receiving a second communication session setup request directed to the second communication client;

activating a single alert function to alert a user of the user device of receipt of both of the first and second communication session setup requests;

receiving, via a user interface of the user device, user input from the user of the device associated with acceptance of the setup of a communication session; and selecting a given one of the first and second communication clients to pass the user input to for processing, whereby a communication session is established via the given communication client via the respective part of the telecommunications network.

Further features and advantages will become apparent from the following description of preferred embodiments, given by way of example only, which is made with reference to the accompanying drawings.

DETAILED DESCRIPTION

Figure 1:
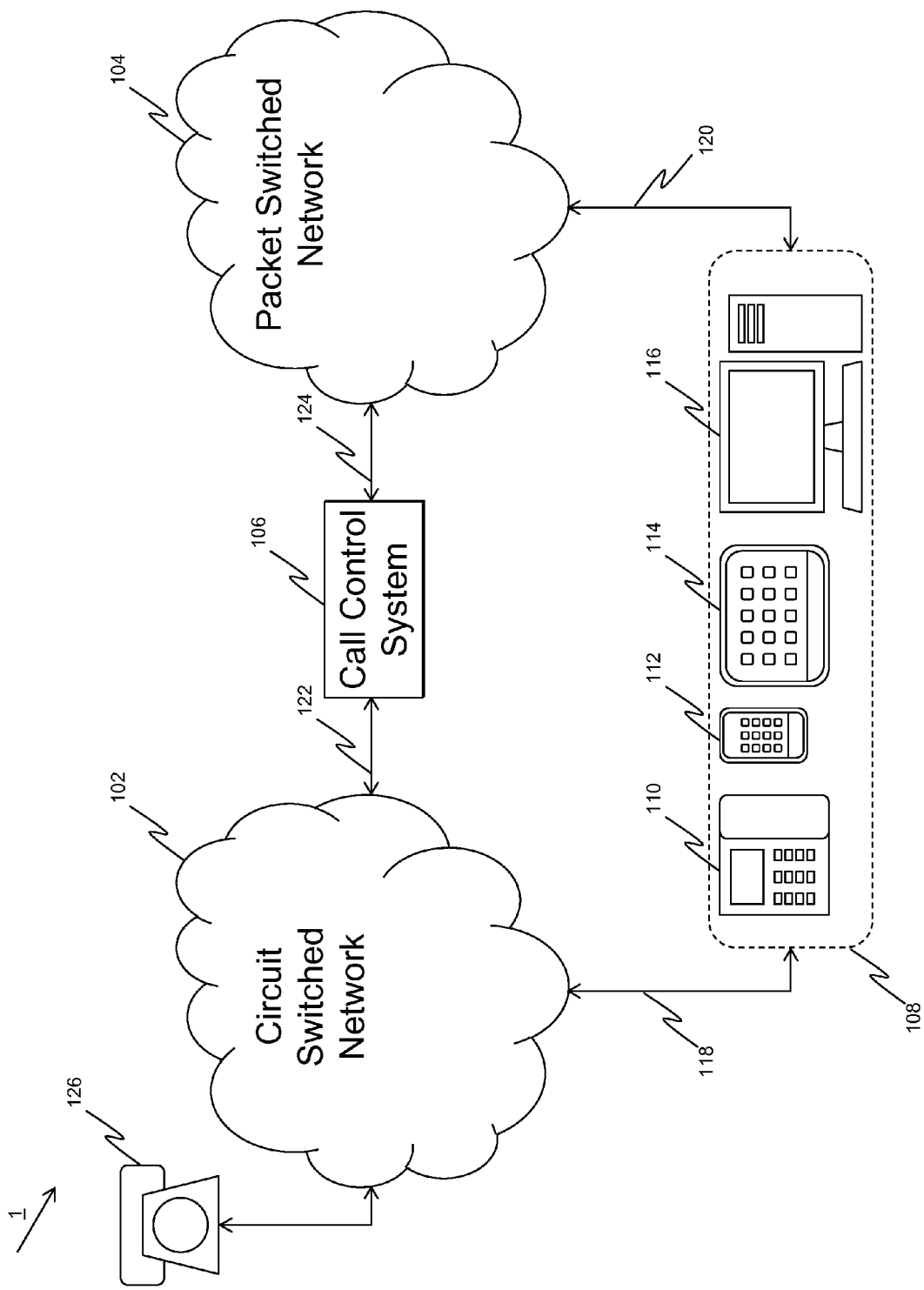
FIG. 1 shows a system diagram according to embodiments.

FIG. 1 shows an exemplary telecommunications network 1 in which embodiments of the present disclosure can be applied. Telecommunications network 1 includes a circuit-switched telecommunications network part 102, a packet-switched network part 104 and may include other network parts (not shown). According to embodiments, a client-shared telephony service is hosted and controlled by a call control system 106.

Although depicted in FIG. 1 as a single network entity located in-between circuit-switched network 102 and packet-switched network 104, call control system 106 may comprise a plurality of network entities, with elements located within circuit-switched network 102 and/or packet-switched network 104 or one or more other networks (not shown). A user of the client-shared telephony service may have a number of user devices 108 through which they may conduct communications via the service. The various user devices 108 through which a user can conduct communications via the service are considered to be associated with that user. The user's associated user devices may include, for example, desk phone 110, mobile (or 'cellular') telephone 112, tablet 114 and/or personal computer 116.

Each of the user's user devices is equipped with one or more interfaces and one or more communication clients for conducting communications in telecommunications network 1. Devices equipped with a circuit-switched interface and communication client are adapted to conduct communications in telecommunications network 1 via link 118 with circuit-switched network 102. The circuit-switched interface may comprise a landline PSTN interface in the case of a fixed-line device such as desk phone 110, or a cellular radio telephony interface in the case of a mobile device such as mobile telephone 112. Devices equipped with a packet-switched communications client are adapted to conduct communications in telecommunications network via link 120 with packet-switched network 104. The packet-switched interface could comprise a wired interface to the internet in the case of a fixed-line device such as personal computer 116, or a wireless interface (e.g. Wi-Fi, Bluetooth, 3G-LTE, WiMax, etc.) to the internet in the case of a mobile device such as tablet 114. The packet-switched interface may comprise an Ethernet part.

Some devices may be equipped with multiple communications clients. For example, in addition to the aforementioned circuit-switched communication client and associated interface, mobile telephone 112 may also be equipped with one or more packet-switched communications clients and interfaces for conducting communications with packet-switched network 104 via link 120. In this case, the multiple communication clients equipped on mobile telephone 112 are referred to as co-located communication clients, i.e. multiple communication clients on a single device.

A communication session between a communication client on one of the user's devices 108 and a communication client on a device 126 of a remote party can be routed between circuit-switched network 102 and call control system 106 via link 122. Link 122 may for example comprise a SIP trunk, or other high capacity communications link. Similarly, communication sessions can be routed between packet-switched network 104 and call control system 106 via link 124. Link 122 and/or link 124 may comprise one or more gateway or session border controller entities (not shown) which carry out conversion between the various protocols and data formats used to transfer media data and signalling data in the different networks making up telecommunications network 1. For example, a media gateway (not shown) may convert between the different protocols of media data passing between circuit-switched network 102 and packet-switched network 104, such as packetised VoIP data into Time-Division-Multiplexing (TDM) voice data and vice versa. A signalling gateway (not shown) may convert between the different protocols of signalling information passing between circuit-switched network 102 and packet-switched network 104, such as SIP, Signalling System 7 (SS7), Integrated Services Digital Network User Part (ISUP), American National Standards Institute (ANSI)—41, Mobile Application Part (MAP) formats, etc.

In order to provide the client-shared telephony service, circuit-switched network 102 is configured to route communication sessions between the user's devices 108 and a remote party device 126 via call control system 106. Call control system 106 may comprise a media gateway controller, service platform, call agent, application server or softswitch and may perform other functions typically associated with such entities. In embodiments, call control system 106 is located in the signalling path for communication sessions conducted to/from a user's devices 108. In embodiments, call control system 106 is located in the media path for communication sessions conducted to/from a user's devices 108.

Figure 2:
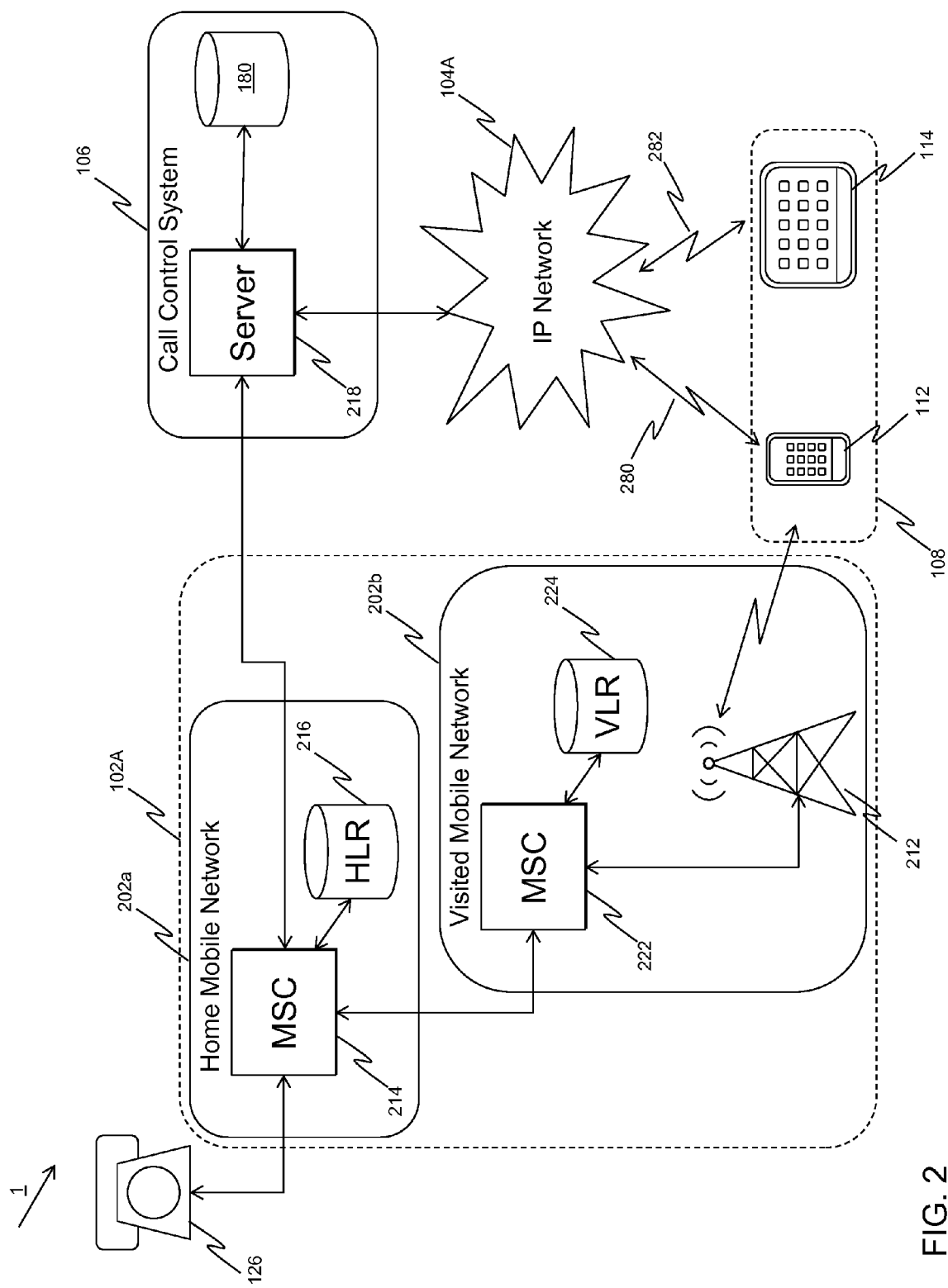
FIG. 2 shows a system diagram according to embodiments.

FIG. 2 shows telecommunications network 1 depicted in FIG. 1 in more detail according to embodiments; in such embodiments, circuit switched-network part 102 comprises a mobile (or 'cellular') telephony network 102A and packet-switched network part 104 comprises IP network 104A. A client-shared telephony service is hosted and controlled by call control system 106.

According to the embodiments shown in FIG. 2, a user of the client-shared telephony service has one or more user devices 108 associated with their client-shared dialling number through which they may conduct communications via the service. In embodiment, the user's associated user devices include, at least, mobile telephone 112. In embodiments, the user's associated devices also include tablet 114.

Mobile telephone 112 is equipped with a cellular radio telephony interface and circuit-switched communication client for conducting communications in telecommunications network 1 via mobile telephony network 102A. In embodiments, mobile telephone 112 is also equipped with at least one wireless packet-switched interface and packet-switched communications client for conducting communications in telecommunications network 1 via radio link 280 with IP network 104A; in such embodiments where mobile telephone 112 comprises multiple communication clients, the communication clients are referred to as co-located communication clients.

Tablet 114 is equipped with at least one wireless packet-switched interface and packet-switched communications client for conducting communications in telecommunications network 1 via radio link 282 with IP network 104A.

The wireless packet-switched interfaces of mobile telephone 112 and/or tablet 114 could comprise a short-range radio interface such as Wi-Fi or Bluetooth, and/or an interface for communication of packet data through a cellular network such as LTE, LTE-A, HSPA, W-CDMA or Mobile WiMax, etc.

Mobile telephony network 102A allows for provision of telephony services to a number of mobile telephones, although only the user's mobile telephone 112 and tablet 114 are depicted in FIG. 2. Mobile telephony network 102A comprises home mobile network part 202a, which is generally associated with mobile telephone 112. Communication sessions initiated to a telephone dialling number associated with mobile telephone 112, e.g. a Mobile Station International Subscriber Directory Number (MSISDN), are routed to home mobile network part 202a for processing as a result of that general association. Home mobile network part 202a comprises mobile switching centre (MSC) 214 and home location register (HLR) 216. HLR 216 comprises a database which provides, upon request, MSC 214 with data relating to users generally associated with home mobile network 202a, such as the location of their mobile telephones and configuration data such as call routing triggers, billing information, etc.

Mobile telephony network 102A also comprises visited mobile network part 202b, which is transiently associated with mobile telephone 112. Visited mobile network part 202b comprises serving MSC 222, Visitor Location Register (VLR) 224 and base transceiver station (BTS) 212. BTS 212 transmits radio signals to, and receives radio signals from, the circuit-switched communications client and cellular radio telephony interface on mobile telephone 112 via a radio communication link. It is this communication relationship that provides the transient association between mobile telephone 112 and visited mobile network part 202b. Mobile telephone 112 is located in an area (commonly known as a 'cell') served by BTS 212. BTS 212 may be controlled by a basestation controller (BSC; not shown), which may also control a number of further BTSs (also not shown), which, in combination with a number of further BSCs and BTSs, may provide a number of geographically distributed cells served by MSC 222.

When mobile telephone 112 associates with serving MSC 222 (e.g. by entering a cell served by MSC 222), serving MSC 222 informs home MSC 214, which in turn updates HLR 216 with the location of mobile telephone 112. In this way, HLR 216 is kept up-to-date with the most recent location of mobile telephone 112. Additionally, configuration data relating to mobile telephone 112 is copied into VLR 224. This allows calls placed by mobile telephone 112 while being served by serving MSC 222 to be correctly handled according to the aforementioned configuration data.

Depending on the location of mobile telephone 112, home mobile network part 202a may also serve mobile telephone 112, in which case it will comprise the same network part as visited mobile network part 202b.

According to embodiments, a client-shared telephony service is provided by associating one or more communication clients (including the packet-switched communication client on mobile telephone 112) with a telephone dialling number associated with the circuit-switched communication client on mobile telephony device 112, such as its MSISDN. This can be referred to as 'twinning' the additional communication clients with the circuit-switched communication client. According to the embodiments, the client-shared dialling number is therefore the MSISDN of the circuit-switched communication client on mobile telephony device 112.

A communication session between a communication client on one of the user's devices 108 and a communication client on a device of a remote party 126 is routed between the remote party device 126 and home mobile network part 202a via one or more further network parts (not shown). In some embodiments, remote party device 126 also comprises a mobile telephone, in which case the communication session may be routed via one or more serving mobile network parts and home mobile network parts associated with the remote party device. These could be the same as mobile network parts 202a and/or 202b, or further mobile network parts (not shown). In other embodiments, remote party device 126 comprises a fixed-line circuit-switched telephone, such as a POTS (or 'analogue') telephone, in which case the communication session may be routed via a PSTN and one or more gateway entities, such as a gateway MSC, to convert between the various protocols and data formats used to transfer media data and signalling data in the PSTN and mobile telephony network 102A. Home MSC 214 may fulfill the role of the gateway entity, or it may be fulfilled by another intermediate entity. In further alternative embodiments, remote party device 126 comprises an IP telephony device, such as a SIP telephone, in which case the communication session may be routed via an IP network, such as the internet, and one or more gateway entities. Again, home MSC 214 may fulfill the role of the gateway entity, or it may be fulfilled by another intermediate entity.

A communication session between a communication client on one of the user's devices 108 and a communication client on remote party device 126 can be routed between mobile telephony network 102A and call control system 106 via, for example, a SIP trunk, or other high capacity communications link. The links between IP network 104A, call control system 106 and mobile telephony network 102A may comprise one or more gateway or session border controller entities (not shown) which carry out conversion between the various protocols and data formats used to transfer media data and signalling data in the different networks making up telecommunications network 1.

In order to provide a client-shared telephony service, mobile telephony network 102A is configured to route communication session setup, signalling and or/media data relating to one of the user's devices 108 via call control system 106. This can be achieved by configuring HLR 216 with one or more triggers for communication session data relating to the client-shared dialling number, such that data originating from or directed to that dialling number results in appropriate communication session signalling data being transmitted to call control system 106. According to some embodiments, this could comprise a routing query to establish where the communication session data should be routed.

In other embodiments, the communication session data itself may be routed to call control system 106, which then handles the transmittal of communication session data to any appropriate further entities. In such embodiments, communication session data transmitted from call control system 106 to the circuit-switched communication client on mobile telephone 112 could be undesirably routed back to call control system 106 by mobile telephony network 102A if routed by conventional methods on the basis of the MSISDN of the circuit-switched communication client. There are several methods for overcoming this behaviour, for example, the transmitted data may include additional information to indicate that the triggers stored in HLR 216 should not be utilised, causing HLR 216 to return the location of the mobile telephone 112 instead of invoking the associated trigger. Alternatively, call control system 106 may be adapted to query HLR 216 directly via a further interface (not shown) to obtain a temporary routing number (TRN) for communicating with the circuit-switched communication client on mobile telephone 112. Routing communications to the circuit-switched communication client on mobile telephone 112 via such a TRN would not invoke the triggers stored in HLR 216, as the client-shared dialling number is not used.

Call control system 106 comprises call control server 218, and user database 180. Call control server 218 is responsible for processing communication session data, including data such as user data stored in database 180. Database 180 is used to store data relating to a number of users of the client-shared telephony service, including a list of identifiers for the communication clients associated with each given user. In this manner, by querying database 180, call control server 218 is able to determine which communication clients and/or devices a communication session setup request received from a remote party should be routed to, or which user a communication session setup request received from a given communication client relates to, etc.

In some embodiments, database 180 is also used to store a user profile for each of the users, containing for example user-configurable preferences. These user-configurable preferences could comprise call routing preferences for defining complex ringing scenarios, which might define a subset of a user's communication clients which should be used to route calls to under certain conditions. For example, a user may wish to configure their user preferences such that only business calls are routed to their desk phone at the office if it is earlier than 6 pm on a weekday, or that calls from family are not routed to their tablet between 9 am and 5 pm on weekdays.

Communication session setup requests can be directed to a specific communication client in a number of ways. According to some embodiments, a communication session setup request is routed to a communication client on the basis of a unique identifier for that communication client. According to other embodiments, communication session setup requests are transmitted to all of a user's communication clients, but with the identifiers of the targeted communication clients included as an additional parameter. In these embodiments, when a communication client receives the communication session setup request, it checks its own identifier against the included identifiers in the additional parameter, and only alerts the user to the communication session setup request if there is a matching identifier.

Call control system 106 may further comprise a media gateway controller, service platform, call agent, application server or softswitch and may perform other functions typically associated with such entities. The elements comprised by call control system 106 may be located within mobile telephony network part 102A and/or IP network part 104A, or one or more other networks (not shown).

By virtue of connecting to mobile telephony network 102A and IP network 104A via a wireless interface, each of the communication clients equipped on mobile telephone 112 may have intermittent connectivity to call control system 106, and therefore are only intermittently able to conduct communications. This may be due to mobility reasons, for example moving in and out of range of the various cells and access points, or due to interference from other wireless communication equipment etc. From the perspective of call control system 106, a communication client on tablet 114 can also be considered to have intermittent availability. Hence, database 180 may be further configured to store availability information for communication clients associated with a given user. According to some embodiments, this is achieved by configuring each communication client to periodically send a message (commonly referred to as a heartbeat) to call control server 218. If such a heartbeat message is not received by call control server 218, that communication client can be considered unavailable until a subsequent heartbeat message is successfully received. Alternatively, in other embodiments, call control server 218 is adapted to periodically "poll" each communication client to probe for its availability using a request response protocol.

Figure 3:
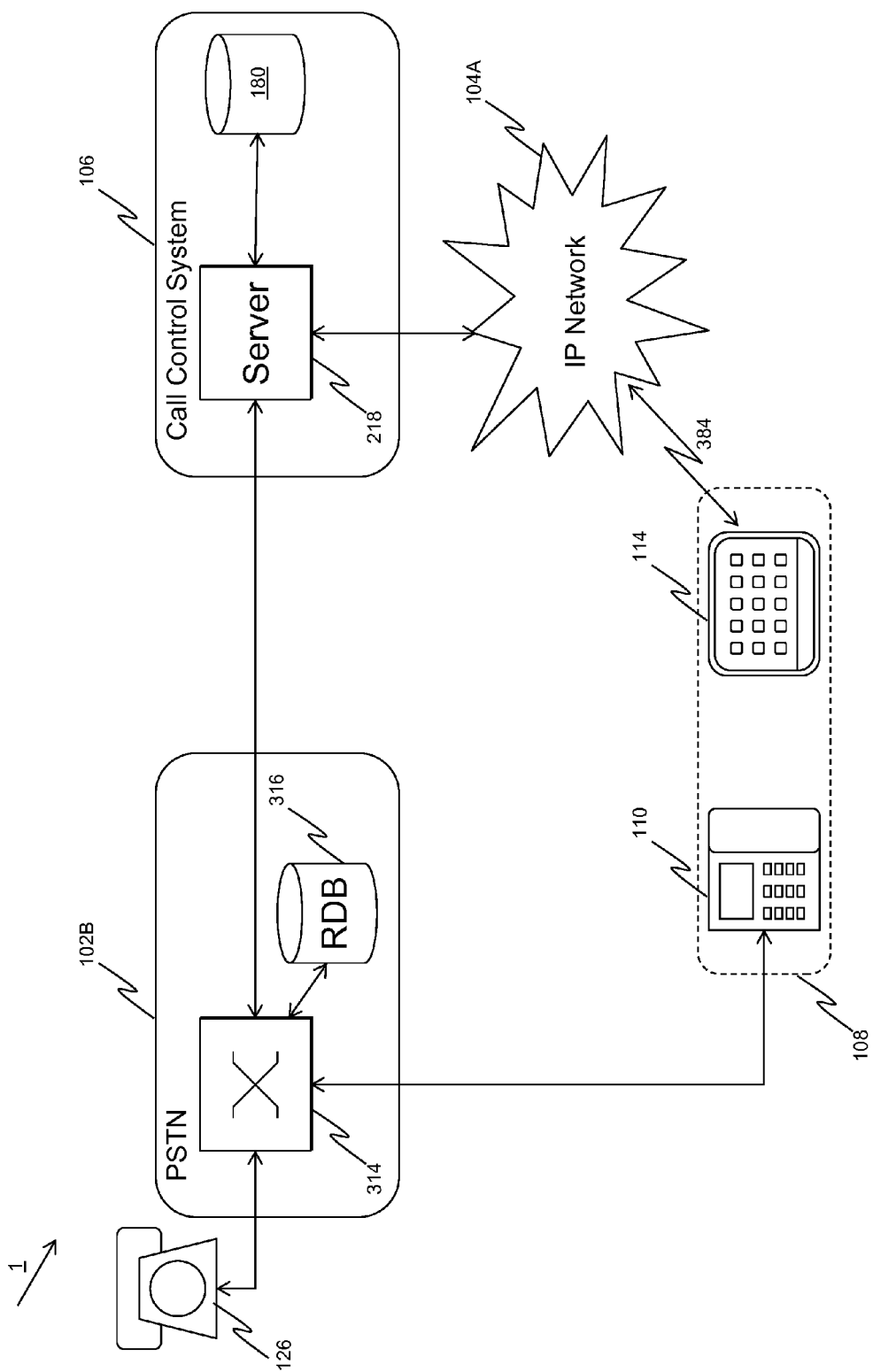
FIG. 3 shows a system diagram according to embodiments.

FIG. 3 shows telecommunications network 1 in more detail according to embodiments; in such embodiments, circuit switched-network part 102 comprises a fixed-line circuit-switched network 102B, such as a PSTN. Telecommunications network 1 includes PSTN part 102B, IP network 104A and may include other network parts (not shown). A client-shared telephony service is hosted and controlled by call control system 106, which comprises call control server 218 and user database 180, the functions of which are similar to those described above in relation to FIG. 2.

Circuit-switched fixed-line telephony network 102B comprises telephone switch 314 and routing database 316. Routing database 316 is queried by telephone switch 314 in order to establish how to route communication session data. As well as providing basic routing information, routing database 316 can be configured with a number of triggers in relation to certain calling or called parties. In embodiments, routing database 316 is configured to route all communication session data either originating from, or directed to, communication clients on one of a user's devices 108 via call control system 106.

In embodiments shown in FIG. 3, the user's devices 108 comprise a desk phone 110 and tablet 114. Desk phone 110 is configured with a fixed-line circuit-switched PSTN interface and a circuit-switched communication client. Tablet 114 is equipped with a wireless packet-switched interface and a packet-switched communication client for conducting communications in telecommunications network 1 via radio link 384 with IP network 104A. The packet-switched client on tablet 114 has been configured into the multiple client shared dialling number telephony service with respect to a telephone dialling number associated with the circuit-switched client on desk phone 110. Again, this can also be described by referring to the packet switched communication client on tablet 114 as having been 'twinned' with the circuit-switched client on desk phone 110.

Figure 4:
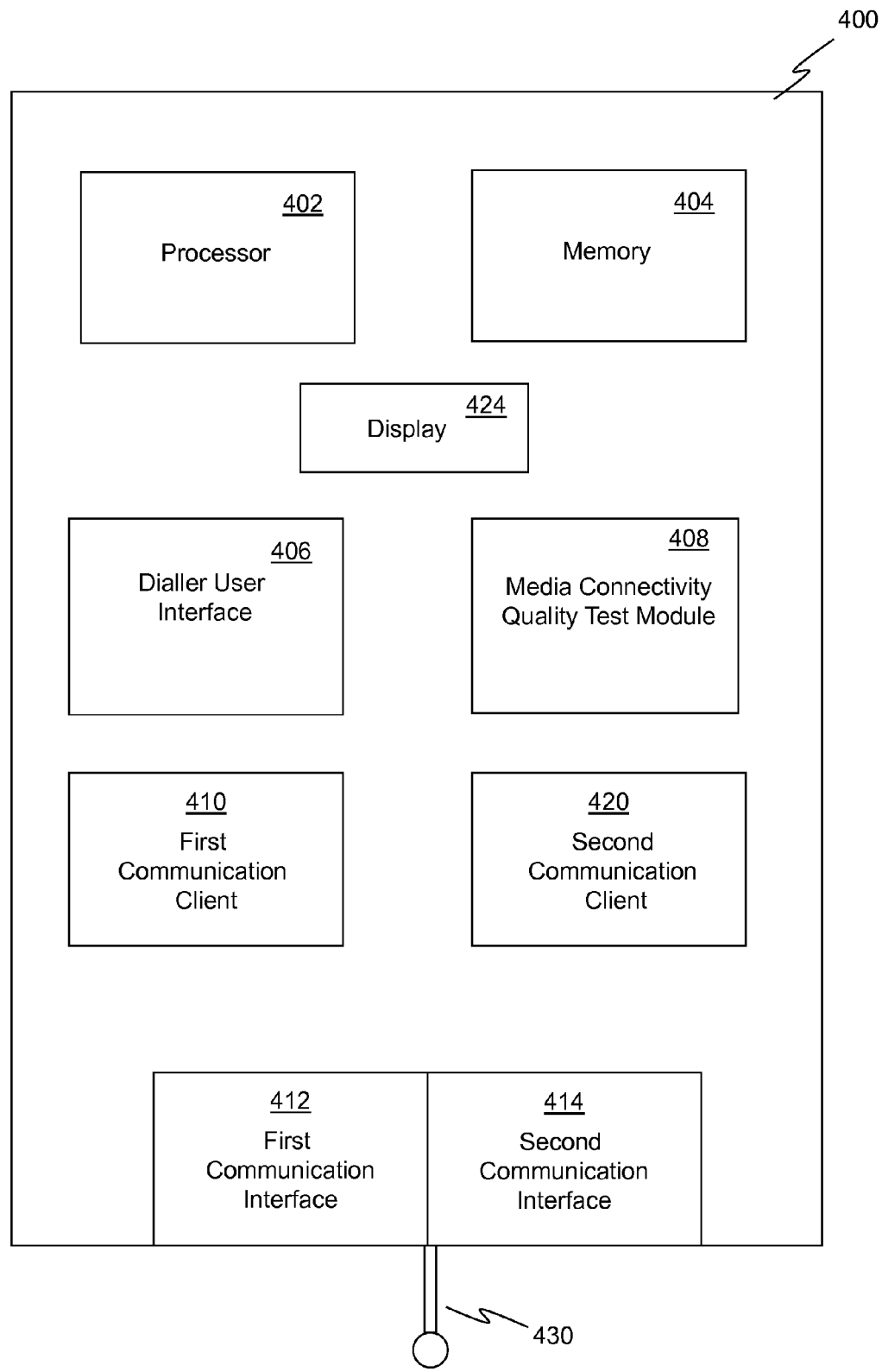
FIG. 4 shows a block diagram according to embodiments.

FIG. 4 shows a user device 400 adapted to conduct communication sessions such as voice calls in telecommunication network 1 according to embodiments. User device 400 may for example comprise mobile telephone 112 depicted in FIG. 1.

User device 400 comprises a processor 402 for carrying out data processing tasks of embodiments. User device 400 comprises a memory 404 for storing data, including predetermined criteria data associated with embodiments. User device 400 comprises a dialler user interface 406 for collecting user input from a user of the device, including user input associated with setting up and acceptance of communication sessions, such as telephone dialling number digits.

In embodiments, user device 400 comprises a display 424, for example a touch-screen display, upon which one or more touch-sensitive screen regions (or 'buttons') are configurable by processor 402.

User device 400 comprises a first communication client 410 adapted to communicate via a first part of telecommunications network 1 and a second communication client 420 adapted to communicate via a second, different part of telecommunications network 1. First communication client 410 and second communication client 420 are co-located on user device 400.

First communication client 410 communicates via a first part of telecommunications network 1 via a first communication interface 412. Second communication client 420 communicates via a second part of telecommunications network 1 via a second communication interface 414. User device 400 includes one or more antennae 430 connected to first communication interface 412 and/or second communication interface 414 for facilitating wireless radio communication.

In embodiments, first communication client 410 comprises a cellular communication client adapted to communicate via a cellular part of telecommunications network 1 and second communication client 420 comprises a VoIP communication client adapted to communicate via a packet-switched part of telecommunications network 1. In embodiments, first communication interface 412 comprises a cellular radio modem and second communication interface 414 comprises a non-cellular radio modem.

Figure 5:
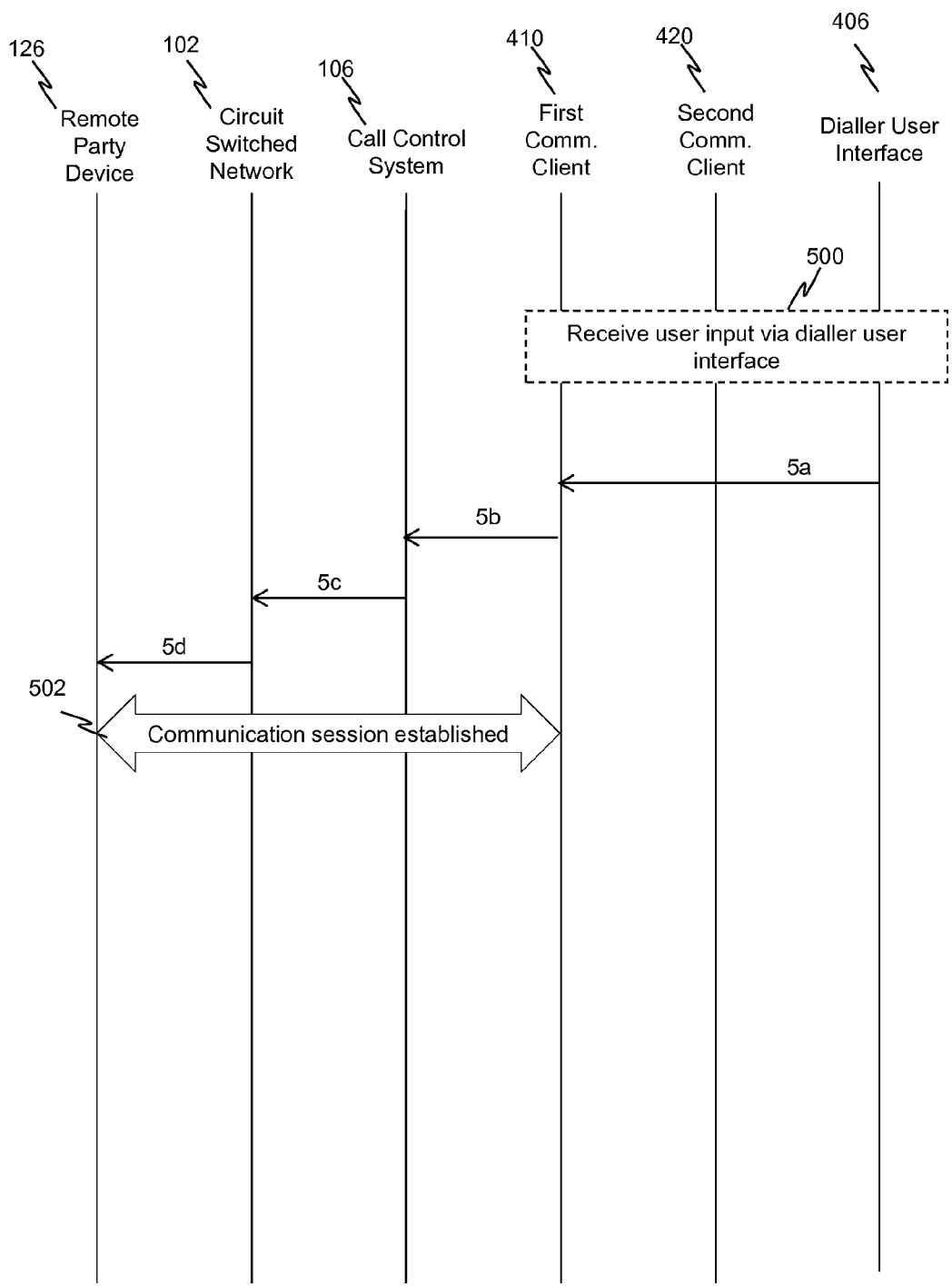
FIG. 5 shows a flow diagram according to embodiments.

Operation of the client-shared telephony service in telecommunications network 1 will now be described. In particular, embodiments described below in relation to FIG. 5 provide ways to initiate voice calls using a user device with multiple co-located communication clients via a dialler user interface.

Embodiments comprise initiating a voice call via dialler user interface 406 on user device 400 in telecommunications network 1. User input from a user of device 400 associated with initiating setup of a communication session is received via dialler user interface 406 of user device 400 as shown by item 500. The user input may for example comprise the user entering in digits of a telephone dialling number of a remote party, for example the telephone number of remote party device 126.

Processor 402 selects a given one of the first communication client 410 and second communication client 420 to pass the user input to for processing and instructs dialler user interface 406 accordingly. In this case, processor 402 selects first communication client 410 and the user input is passed to first communication client 410 for processing as shown by step 5*a*.

When the user input is received and processed by the given one of the first and second communication clients, the given communication client transmits a communication session setup request message into the respective part of the telecommunications network in step 5*b*. Call control system 106 is located in the signalling path for calls to/from user device 400, so the communication session setup request message of step 5*b* transmitted from user device 400 arrives at call control system 106.

Upon receipt of the communication session setup request message of step 5*b*, call control system 106 performs any necessary lookups or queries in one or more routing databases and routes the communication session setup request message of step 5*b* on to remote party device 126 via circuit-switched network 102 in steps 5*c* and 5*d*.

A communication session is thus established between remote party device 126 and first communication client 410 of user device 400 as shown by item 502.

In embodiments, if the selected communication client comprises a cellular communication client, then the selected communication client transmits an appropriate communication session setup request message into a cellular part of telecommunications network 1. Alternatively, if the selected communication client comprises a VoIP communication client, then the selected communication client transmits an appropriate communication session setup request message into a packet-switched part of telecommunications network 1.

In embodiments, processor 402 selects which given communication client to pass the user input to for processing in response to processor 402 determining that both the first communication client 410 and the second communication client 420 are available for communication with their respective parts of the telecommunications network.

In embodiments, processor 402 determines the given communication client to pass the user input to for processing at least in part on the basis of one or more predetermined criteria stored in memory 404.

In embodiments, the one or more predetermined criteria comprise a default criterion that a VoIP communication client adapted to communicate via a packet-switched part of telecommunications network 1 is to be selected as the given communication client. Such a default setting may for example be appropriate for a user who spends a relatively large proportion of their time within areas of reliable WiFi access to the internet. Further, such a user may use enhanced call features which are available via WiFi.

In embodiments, the one or more predetermined criteria comprise a default criterion that a cellular communication client adapted to communicate via a cellular radio part of the telecommunications network is to be selected as the given communication client. Such a default setting may for example be appropriate for a user who spends a relatively large proportion of their time on the move and can hence avoid problems associated with moving out of range of WiFi hotspots (i.e. out of geographical range of one or more wireless access points associated with the hotspots).

In embodiments, when a communication session setup request transmitted on the basis of a default criterion fails to result in establishment of a communication session, processor 402 passes the user input from the user of device 400 for initiating the communication session to a further one of the first and second communication clients 410, 420 for processing. Such embodiments result in a further communication session setup request being transmitted from the further communication client into the respective part of the telecommunications network. For example if user input passed to a cellular communication client and subsequent transmittal of a communication session setup request into a cellular part of telecommunication network 1 do not result in a voice call being established with the appropriate remote party device, a further communication attempt can be initiated by passing the user input to a VoIP communication client, resulting in transmittal of a further communication session setup request into a packet-switched part of telecommunication network 1.

Such a further communication session setup request is transmitted without the need for further input from the user via dialler user interface 406. The user need not know that the first communication session setup attempt failed.

In embodiments, at least one of the one or more predetermined criteria is user-configurable. For example a user who is on the move frequently, may configure a predetermined criterion such that their default communication client is a cellular communication client. Such user-configurations of predetermined criteria are stored in memory 404.

In embodiments, processor 402 determines which of the first and second communication clients 410, 420 comprises the given communication client to which the user input received via dialler user interface 406 is passed to for processing at least in part on the basis of media connectivity quality estimate data associated with current media connectivity quality of one or more of the first and second communication clients.

In embodiments, media connectivity quality estimate data is determined by media connectivity quality test module 408 by conducting one or more media test communication sessions via one or more of first and second communication clients 410, 420. Media connectivity quality test module 408 passes the media connectivity quality estimate data to processor 402 which can use such data at least in part to select the communication client to pass the user input to for processing.

In embodiments, processor 402 selects a communication client which is indicated in media connectivity quality estimate data as having a higher connectivity quality estimate to pass the user input received via dialler user interface 406 to for processing.

In embodiments, media connectivity quality test module 408 conducts one or more media test communication sessions via first communication client 410 and/or second communication client 420 periodically. Such periodic testing assists in providing up-to-date media connectivity quality estimate data to processor 402.

In embodiments, media connectivity quality test module 408 conducts one or more media test communication sessions in response to a user opening one or more of first and second communication clients 410, 420. When a user opens up a communication client on user device 400, for example opening application software associated with the communication client, it is likely that the user is going to initiate a communication session with a remote party in the near future; initiating media test communication sessions in response to such user action helps to avoid delays in providing media connectivity quality estimate data to processor 402.

In embodiments, a media test communication session conducted via a VoIP communication client is initiated by transmittal of a SIP INVITE message containing an Alert-Info header with a 'loopback' parameter into a packet-switched part of the telecommunications network. Such an INVITE message can identify to an appropriate network entity such as a Session Border Controller (SBC), SIP proxy, call control system 106 or suchlike that a test of the media path to/from user device 400 should be conducted.

In embodiments, a SIP communication client tests the quality of voice media over a WiFi access network.

In some embodiments, the SIP communication client initiates this test by sending a SIP INVITE message towards the network. The contents of the INVITE message would indicate to the network that this is a media test call. This could be accomplished for example by including an Alert-Info header with the value "Loopback". The first SIP signalling element in the network that receives such an INVITE, typically the access SBC, would recognize the INVITE as requesting a test call. It would respond immediately with a 200 OK response that includes a Session Description Protocol (SDP) offer which identifies a loopback media port to which the SIP communication client can send media. On receipt of the 200 OK response, the SIP communication client would send a series of RTP test media packets towards the designated port on the SBC, which would turn each packet round and send it back towards the SIP communication client. The SIP communication client would measure the one or more of round trip delay, packet loss and jitter of the returned media stream to derive an estimate of media quality for the WiFi access network.

In some embodiments, the SIP communication client initiates tests a quality of voice media this test by sending a SIP INVITE message towards the network which includes SDP data that indicates a request for a loopback connection, in accordance with the Internet Draft draft-ietf-mmusic-media-loopback-16.

Note that since the media stream has been sent both upstream and downstream, the test media stream received at the SIP communication client has been subjected to both upstream and downstream quality impairments in the WiFi access network, so the derived estimate of media quality represents an aggregate of upstream and downstream quality.

Having completed this test, the SIP communication client would tear down the test call in the conventional way, by sending a SIP BYE request.

In embodiments described above, processor 402 selects a given one of the first and second communication clients 410, 420 to pass the user input received via dialler user interface 406 to for processing in response to determining that both of the first and second communication clients 410, 420 are available for communication with their respective part of the telecommunications network. In other embodiments, processor 402 determines that only one of first and second communication clients 410, 420 is available for communication with the respective part of telecommunications network 1. In such embodiments, processor 402 passes the user input received via dialler user interface 406 to the one of the first and second communication clients 410, 420 which is available, resulting in a communication session setup request being transmitted from the one available communication client into the respective part of telecommunications network 1. Such embodiments avoid attempts to communicate via a communication client which is currently unavailable. Such embodiments may involve overriding one or more predetermined criteria and/or default criteria.

In embodiments, the selecting comprises determining whether user device 400 is within range of one or more wireless access points in a predetermined list of preferred wireless access points. If it is determined that the user device is within range of the one or more wireless access points in the predetermined list, then a communication client which allows access to the one or more wireless access points from the list is selected. For example, such embodiments allow calls to be preferentially conducted via a known WiFi network such as at a home or work location, but not elsewhere. The user device could employ a geographical location of the user device and/or availability information for communication clients in the decision making process. The list of preferred wireless access points could comprise 'favourite' or 'trusted' wireless access points of a user and could be user-configurable. Alternatively and/or additionally, the list of preferred wireless access points could be determined at least in part by the user device on the basis of a history of previously successful and/or failed WiFi call attempts.

Embodiments comprise maintaining a blacklist of one or more network parts. The blacklist could for example be stored in memory 404. In such embodiments, the selecting comprises selecting a communication client which is capable of conducting a voice call without involving the one or more network parts on the blacklist. In embodiments, the one or more network parts on the blacklist comprise one or more wireless access points. Such embodiments help to avoid attempts to communicate via unsuitable network parts. For example, a hotel WiFi network might be deemed unsuitable because its wireless access points block access to one or more communications "ports" unless a fee is paid; such wireless access points can therefore be added to the blacklist. In embodiments, the one or more network parts on the blacklist comprise one or more connection routes or network nodes. For example, a communication client associated with a connection with call control system 106 which regularly gets torn down by an intermediate device in packet network 104 could be avoided by adding the connection route and/or intermediate device to the blacklist. In embodiments, the blacklist is user-configurable.

Embodiments described below provide improved ways of operating a user device in telecommunication network 1. In particular, embodiments described below in relation to FIG. 6 comprise processing incoming communication session setup requests using a device with multiple co-located communication clients. Such embodiments involve processing of an incoming communication session setup attempt from a remote party device, for example a call setup attempt associated with an incoming call from remote party device 126 to user device 400.

User device 400 comprises first and second co-located communication clients 410, 420 adapted to communicate via first and second parts of telecommunications network 1 respectively. User device 400 may for example comprise mobile telephone 112 depicted in FIG. 1.

Figure 6:
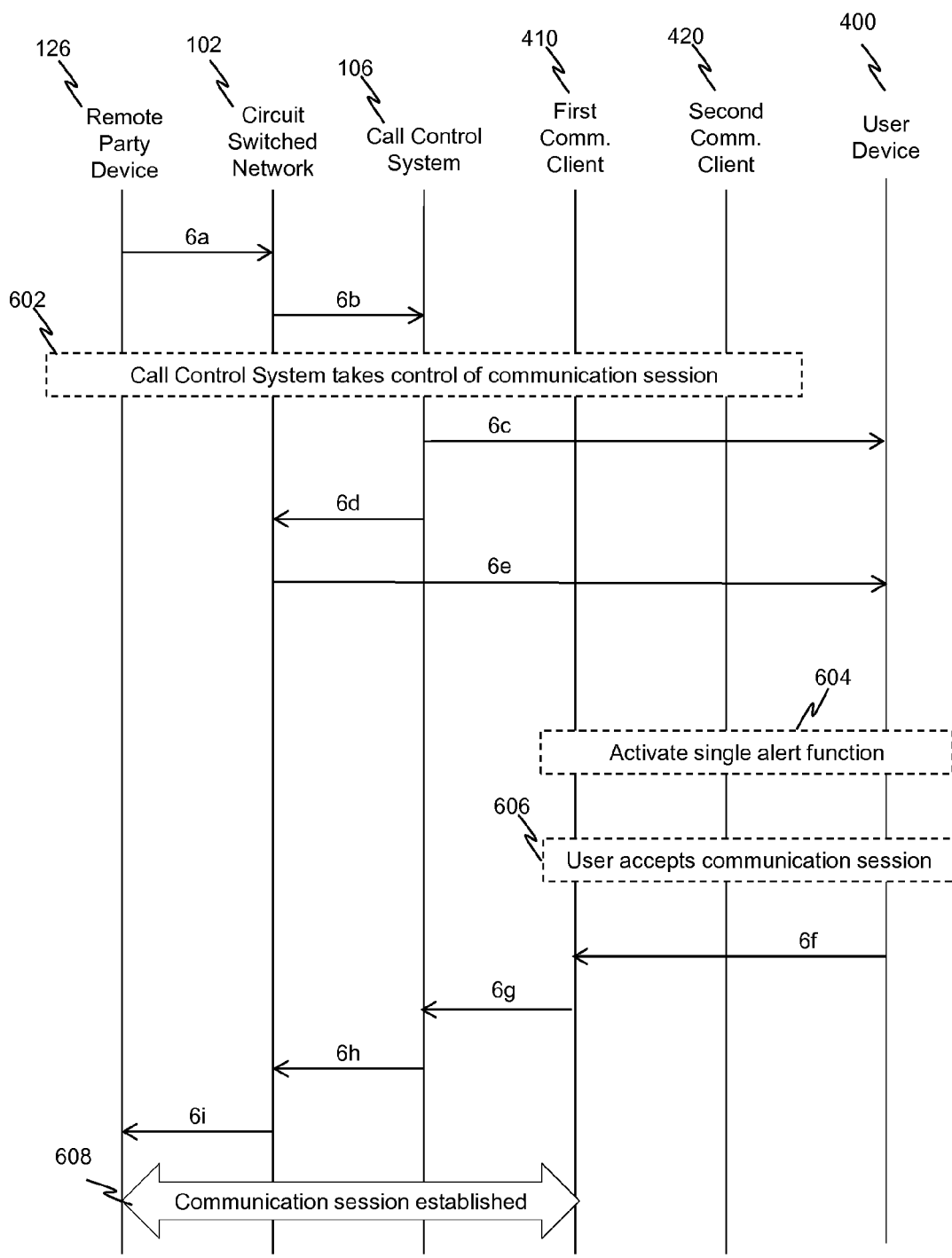
FIG. 6 shows a flow diagram according to embodiments.

A remote party initiates a communication session setup attempt on remote party device 126 directed to device 400 by entering an appropriate identifier for one of the communication clients on user device 400 which results in call control system 106 receiving appropriate communication session setup signalling, as shown by steps 6a and 6b of FIG. 6. The identifier may for example comprise a telephone dialling number or a SIP Uniform Resource Identifier (URI) or suchlike.

Call control system 106 takes control of the communication session as per item 602 in FIG. 6. In embodiments, call control system 106 performs a lookup in database 180 for the identifier received in step 6b and determines that the remote party is attempting to setup a communication session with the user of device 400 on which first communication client 410 and second communication client 420 are co-located.

Note that the user of device 400 may also have other associated communication clients on other devices, although contact with such other devices will not be described here.

Call control system 106 initiates measures which lead to transmittal of a first communication session setup request directed to first communication client 410 to user device 400 in step 6c and transmittal of a second communication session setup request directed to second communication client 420 to user device 400 via circuit-switched network 102 in steps 6d and 6e.

In embodiments, first communication client 410 comprises a VoIP communication client, i.e. a packet-switch communication client, and call control system 106 transmits a communication session setup request to first communication client 410 via packet-switched network 104. In embodiments, second communication client 420 comprises a cellular communication client, in this case a circuit-switched client, and call control system 106 transmits a communication session setup request to second communication client 420 via circuit-switched network 102.

User device 400 therefore receives a first communication session setup request directed to first communication client 410 in step 6c and also a second communication session setup request directed to second communication client 420 in step 6e. User device 400 is configured to pass the first and second communication session setup requests to processor 402 for processing, rather than passing such communication session setup requests directly to the respective first and second communication clients 410, 420.

Upon receipt of the first and second communication session setup requests, processor 402 activates a single alert function of user device 400 to alert the user of user device 400 of the receipt of both of the first and second communication session setup requests directed to both the first and second communication clients 410, 420 as shown by item 604. Note that only a single alert function is activated by processor 402 on user device 400, rather than one alert function for each of the two received communication session setup requests; this avoids the user having to listen to multiple rings or suchlike associated with multiple communication clients and thus avoids any confusion which might be caused by such multiple rings. In embodiments, the single alert function could comprise a ring function and a vibrate function.

The user of device 400 is offered only a single alert notification, despite the presence of two incoming communication session setup requests which leads to an improved user experience.

Upon noticing the single activated alert function, the user enters in suitable user input on a user interface of user device 400 to accept setup of a communication session as shown by item 606. The user input may for example comprise the user pressing an 'accept call' button or similar configured on a display 424 of device 400. The accept call button may for example comprise a softkey configured on display 424 in association with a key of a keypad (not shown) on user device 400. In embodiments where display 424 comprises a touch-screen user-interface, the accept call button may comprise a touch-sensitive button configured on display 424.

The user input from the user of device 400 associated with acceptance of the setup of a communication session is received and passed to processor 402 for processing. Processor 402 selects a given one of first communication client 410 and second communication client 420 to pass the user input to for processing. When the user input is received and processed by the given one of first and second communication clients, the given one of the first and second communication clients transmits an appropriate communication session setup response (acceptance) message via the respective part of telecommunications network 1.

In the embodiments depicted in FIG. 6, processor 402 select first communication client 410 to pass the user input to for processing and the user input is passed to first communication client 410 accordingly in step 6f.

In embodiments where processor 402 selects first communication client 410 to pass the user input to for processing and first communication client 410 comprises a packet-switched communication client, first communication client 410 transmits a communication session setup response (acceptance) message via packet-switched network 104 to call control system 106 as shown by step 6g.

Call control system 106 then transmits a communication session setup response (acceptance) message back to remote party device 126 via circuit-switched network 102 as shown by steps 6h and 6i in FIG. 6. Since an end-to-end communication session setup signalling flow has now been completed, a communication session is established between remote party device 126 and first communication client 410 as shown by item 608 of FIG. 6.

In embodiments where processor 402 selects second communication client 420 to pass the user input to for processing and second communication client 420 comprises a circuit-switched communication client, second communication client 420 transmits a communication session setup response (acceptance) message via circuit-switched network 102 to call control system 106. Call control system 106 then transmits a communication session setup response (acceptance) message back to remote party device 126, for example via circuit-switched network 102. Since an end-to-end communication session setup signalling flow has now been completed, a communication session is established between remote party device 126 and second communication client 420 of user device 400.

In embodiments, processor 402 determines which of the first and second communication clients 410, 420 is the given communication client to which the user input is passed to for processing at least in part on the basis of one or more predetermined criteria. The predetermined criteria may for example be stored in memory 404 of user device 400.

In embodiments, at least one of the one or more predetermined criteria is user-configurable by a user of user device 400. Such user-configurations of predetermined criteria may for example be stored in memory 404.

In some embodiments, one or more predetermined criteria comprise a default criterion that a VoIP communication client adapted to communicate via a packet-switched part of telecommunications network 1 is to be selected as the given communication client. In other embodiments, the one or more predetermined criteria comprise a default criterion that a cellular communication client adapted to communicate via a cellular radio part of telecommunications network 1 is to be selected as the given communication client.

In embodiments, first communication client 410 comprises a cellular communication client adapted to communicate via a cellular part of telecommunications network 1 and second communication client 420 comprises a VoIP communication client adapted to communicate via a packet-switched part of telecommunications network 1.

In embodiments, where first communication client 410 comprises a cellular communication client and second communication client 420 comprises a VoIP communication client, the given communication client comprises the first communication client. In such embodiments, processor 402 is configured to transmit, in response to receipt of the second communication session setup request directed to the second communication client, a communication session setup rejection message into the packet-switched part of telecommunications network 1 which is received by call control system 106. Note that in these embodiments, this rejection message is transmitted even if the second, VoIP communication client is available for conducting communications. In such embodiments, the communication session setup attempt directed towards the first, cellular communication client 420 fails in the cellular network and call control system 106 receives a corresponding failure message. Call control system 106 therefore decides to attempt to setup communications via the second, VoIP communication client a second time and transmits a further communication session setup request directed to second, VoIP communication client 420 of user device 400.

In response to receipt of the further communication session setup request directed to second, VoIP communication client 420, processor 402 of user device 400 determines that the first, cellular communication client is currently unavailable (in this case due to a failure in the cellular network). Processor 402 therefore passes the user input received in response to the single activated alert function to the second, VoIP communication client 420 for processing. A communication session is then established using the second, VoIP, communication client via the packet-switched part of telecommunications network 1. In such embodiments, a communication session is still established despite the initial selection of the first, cellular communication client 410 leading to a communication failure.

In embodiments, the further communication session setup request generated by call control system comprises a SIP INVITE message and call control system 106 inserts an Alert-Info header containing a 'info=cell-failed' parameter into the SIP INVITE message. When processor 402 receives the further communication session setup request message in the form of the SIP INVITE message containing the Alert-Info header with embedded 'info=cell-failed' parameter, processor 402 inspects the Alert-Info header containing the 'cell-failed info' parameter and determines that communication via the first, cellular communication client 420 is currently not possible (i.e. first, cellular communication client 420 is currently unavailable); on this basis, processor 402 thus decides to instead attempt to setup communications via the second, VoIP communication client.

In alternative embodiments, to signal the failure of a communication session setup attempted via the cellular network to the user device, call control system 106 inserts an Alert-Info header containing a parameter different from an 'info=cell-failed' parameter. In further alternative embodiments, a different SIP header from an Alert-Info header is employed. In yet further embodiments, the failure of a communication session setup attempted via the cellular network to the user device can be signalled via signalling other than SIP INVITE messaging and associated headers.

In embodiments, processor 402 determines which of the first and second communication clients 410, 420 comprises the given communication client to which the user input associated with acceptance of the setup of a communication session is passed to for processing at least in part on the basis of media connectivity quality estimate data associated with current media connectivity quality of one or more of first and second communication clients 410, 420.

In embodiments, media connectivity quality estimate data is determined by media connectivity quality test module 408 of user device 400 by conducting one or more media test communication sessions via one or more of first and second communication clients 410, 420. Media connectivity quality test module 408 passes the media connectivity quality estimate data to processor 402 which can use such data to select the communication client to pass the user input to for processing. In embodiments, processor 402 selects a communication client which is indicated in media connectivity quality estimate data as having a higher connectivity quality estimate to pass the user input to for processing.

In embodiments, media connectivity quality test module 408 conducts one or more media test communication sessions via first communication client 410 and/or second communication client 420 periodically. Such periodic testing assists in providing up-to-date media connectivity quality estimate data to processor 402.

In embodiments, media connectivity quality test module 408 conducts one or more media test communication sessions in response to a user opening one or more of first and second communication clients 410, 420.

In embodiments, a media test communication session conducted via a VoIP communication client is initiated by transmittal of a SIP INVITE message containing an Alert-Info header with a 'Loopback' parameter into a packet-switched part of the telecommunications network. Such an INVITE message can identify to an appropriate network entity such as an SBC, SIP proxy, call control system 106 or suchlike that a test of the media path to/from user device 400 should be conducted.

In some embodiments, the SIP communication client initiates tests a quality of voice media this test by sending a SIP INVITE message towards the network which includes SDP data that indicates a request for a loopback connection, in accordance with the Internet Draft draft-ietf-mmusic-media-loopback-16.

In embodiments, the selecting comprises determining whether user device 400 is within range of one or more wireless access points in a predetermined list of preferred wireless access points. If it is determined that the user device is within range of the one or more wireless access points in the predetermined list, then a communication client which allows access to the one or more wireless access points from the list is selected.

Embodiments comprise maintaining a blacklist of one or more network parts. The blacklist could for example be stored in memory 404. In such embodiments, the selecting comprises selecting a communication client which is capable of conducting a voice call without involving the one or more network parts on the blacklist. In embodiments, the one or more network parts on the blacklist comprise one or more wireless access points. Such embodiments help to avoid attempts to communicate via unsuitable network parts. In embodiments, the blacklist is user-configurable.

In embodiments of the invention, if multiple co-located communication clients on a device are available, the user is offered a single notification of an incoming call. The decision as to which communication client is used to answer the call is made automatically by a control system on the user device (for example processor 402) if the user chooses to answer the call. The decision may be made on the basis of a default preference, or by leveraging some knowledge of the relative health of the connections to/from the multiple co-located communication clients. Hence, embodiments allow, in areas of poor cellular signal, a trusted Wi-Fi™ network to simulate the behaviour of a femtocell, allowing stable voice calls to be carried out which would otherwise not be possible.

In embodiments described above in relation to FIG. 6, upon receipt of the incoming call request of step 6*b*, call control system 106 takes control of the communication session and initiates measures which lead to transmittal of first and second communication session setup requests directed to first and second communication clients 410, 420 on user device 400. In some situations, for example due to a network failure or network congestion or suchlike, one of the communication session setup requests may not arrive at user device 400 at all or may not arrive until after a relatively long delay. In embodiments, user device 400 is configured to still alert the user of an incoming call, even though only a single communication session setup request has been received. Communication can thus still take place via the communication client which is not suffering from network problems.

Embodiments comprise a method of operating a user device in a telecommunications network, the user device comprising at least a first communication client adapted to communicate via a first part of the telecommunications network and a second communication client adapted to communicate via a second, different part of the telecommunications network, the method comprising, at the user device:

receiving at least one communication session setup request directed to at least one of the first and second communication clients;

activating a single alert function to alert a user of the user device of receipt of the at least one communication session setup request;

receiving, via a user interface of the user device, user input from the user of the device associated with acceptance of the setup of a communication session; and selecting a given one of the first and second communication clients to pass the user input to for processing, whereby a communication session is established via the given communication client via the respective part of the telecommunications network. In embodiments, the selected communication client comprises the communication client to which the received at least one communication session setup request was directed to.

The above embodiments are to be understood as illustrative examples of the invention. Further embodiments of the invention are envisaged.

Although processor 402 is depicted as a single processor in FIG. 4, processor 402 may comprise a processing system of one or more processors. Any or all functions of processor 402 may be carried out by computer software, firmware, application software and/or an operating system of user device 400.

Remote party device 126 has been described above as being provided with communication services via circuit-switched network 102. Remote party device can equally be provided with communication services via one or more other networks, including cellular networks, non-cellular networks, IP networks, IP Multimedia Subsystem (IMS) networks, etc.

Embodiments described above describe operation of a user device comprising two co-located communication clients; embodiments could equally apply to communication clients comprising more than two co-located communication clients.

Embodiments above describe the decision as to which communication client to select to pass the user input to for processing being taken by the user device, for example by processor 402. In alternative embodiments, the user of the device can be involved in the decision, for example the user can be given two or more options as to which communication client to receive an incoming call on or which communication client to make an outgoing call via. In embodiments, the various communication client options are presented to the user in real-time via display 424 and the user can select a communication client of their choosing by making suitable user input on user device 400, for example via a touch-screen portion of display 424.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of initiating a voice call via a dialler user interface on a user device in a telecommunications network, the method comprising:

at the user device, receiving, via the dialler user interface of the user device, user input from a user of the device associated with initiating setup of a communication session, wherein the user device comprises at least a first communication client adapted to communicate voice calls via a first part of the telecommunications network and a second communication client adapted to communicate voice calls via a second, different part of the telecommunications network, wherein the communication session comprises a voice call involving the transfer of media data to or from a remote device; and at the user device, selecting a given one of the first and second communication clients to pass the user input to for processing; and at the user device, in response to the selecting, causing, at the given communication client, transmittal of a communication session setup request to initiate a voice call, from the given communication client into the respective part of the telecommunications network.

2. The method according to claim 1, wherein the selection is carried out in response to determining that both of the first and second communication clients are available for communication with their respective part of the telecommunications network.

3. The method according to claim 1, further comprising determining which of the first and second communication clients is selected as the given communication client at least in part on the basis of one or more predetermined criteria.

4. The method according to claim 3, wherein the one or more predetermined criteria comprise a default criterion that a Voice over Internet Protocol (VoIP) communication client adapted to communicate via a packet-switched part of the telecommunications network is to be selected as the given communication client.

5. The method according to claim 3, wherein the one or more predetermined criteria comprise a default criterion that a cellular communication client adapted to communicate via a cellular radio part of the telecommunications network is to be selected as the given communication client.

6. The method according to claim 4, wherein in the case of a communication session setup request transmitted on the basis of a default criterion failing to result in establishment of a communication session, the method comprises passing the user input from the user of the device for initiating the communication session to a further one of the first and second communication clients for processing, whereby a further communication session setup request is transmitted from the further communication client into the respective part of the telecommunications network.

7. The method according to claim 3, wherein at least one of the one or more predetermined criteria is user-configurable.

8. The method according to claim 1, wherein one of the first and second communication clients comprises a cellular communication client adapted to communicate via a cellular part of the telecommunications network and the other of the first and second communication clients comprises a Voice over Internet Protocol (VoIP) communication client adapted to communicate via a packet-switched part of the telecommunications network.

9. The method according to claim 1, further comprising determining which of the first and second communication clients comprises the given communication client at least in part on the basis of media connectivity quality estimate data associated with current media connectivity quality of one or more of the first and second communication clients.

10. The method according to claim 9, further comprising determining the media connectivity quality estimate data by conducting one or more media test communication sessions via one or more of the first and second communication clients.

11. The method according to claim 10, further comprising conducting the one or more media test communication sessions periodically.

12. The method according to claim 10, further comprising conducting the one or more media test communication sessions in response to a user opening one or more of the first and second communication clients.

13. The method according to claim 10, wherein a media test communication session conducted via a Voice over Internet Protocol (VoIP) communication client is initiated by transmittal of a SIP INVITE message containing an Alert-Info header with a 'Loopback' parameter into a packet-switched part of the telecommunications network.

14. The method according to claim 1, further comprising, in response to determining that only one of the at least first and second communication clients is available for communication with the respective part of the telecommunications network, passing the input from the user of the device for initiating the communication session via the one available communication clients for processing, whereby a communication session setup request is transmitted from the one available communication client into the respective part of the telecommunications network.

15. The method according to claim 1, wherein the selecting comprises:
    determining whether the user device is within range of one or more wireless access points in a predetermined list of preferred wireless access points, and
    in response to determining that the user device is within range of the one or more wireless access points in the predetermined list, selecting a communication client which allows access to said one or more wireless access points from the list.

16. The method according to claim 1, further comprising maintaining a blacklist of one or more network parts, wherein the selecting comprises selecting a communication client which is capable of conducting a voice call without involving the one or more network parts on the blacklist 17. The method according to claim 16, wherein the one or more network parts comprises one or more wireless access points.

18. Apparatus for use in initiating a voice call via a dialler user interface on a user device in a telecommunications network, the apparatus comprising a processing system adapted to:
    at the user device, receive, via the dialler user interface of the user device, user input from a user of the device associated with initiating setup of a communication session, wherein the user device comprises at least a first communication client adapted to communicate voice calls via a first part of the telecommunications network and a second communication client adapted to communicate voice calls via a second, different part of the telecommunications network, wherein the communication session comprises a voice call involving the transfer of media data to or from a remote device; and
    at the user device, select a given one of the first and second communication clients to pass the user input to for processing; and
    at the user device, in response to the selecting, cause, at the Oven communication client, transmittal of a communication session setup request to initiate a voice call, from the given communication client into the respective part of the telecommunications network.

19. A computer program product comprising a non-transitory computer-readable storage medium having computer readable instructions stored thereon, the computer readable instructions being executable by a computerized device to cause the computerized device to perform a method for initiating a voice call via a dialler user interface on a user device in a telecommunications network, the method comprising:
    at the user device, receiving, via the dialler user interface of the user device, user input from a user of the device associated with initiating setup of a communication session, wherein the user device comprises at least a first communication client adapted to communicate voice calls via a first part of the telecommunications network and a second communication client adapted to communicate voice calls via a second, different part of the telecommunications network, wherein the communication session comprises a voice call involving the transfer of media data to or from a remote device; and
    at the user device, selecting a given one of the first and second communication clients to pass the user input to for processing; and
    at the user device, in response to the selecting, causing, at the given communication client, transmittal of a communication session setup request to initiate a voice call, from the given communication client into the respective part of the telecommunications network.

20. A method of initiating a voice call via a dialler user interface on a user device in a telecommunications network, the user device comprising at least a first communication client adapted to communicate via a first part of the telecommunications network and a second communication client adapted to communicate via a second, different part of the telecommunications network, the method comprising, at the user device:
- receiving, via the dialler user interface of the user device, user input from a user of the device associated with initiating setup of a communication session;
- selecting a given one of the first and second communication clients to pass the user input to for processing, whereby a communication session setup request is transmitted from the given communication client into the respective part of the telecommunications network; and
- determining which of the first and second communication clients is selected as the given communication client at least in part on the basis of one or more predetermined criteria, wherein the one or more predetermined criteria comprise a default criterion that a Voice over Internet Protocol (VoIP) communication client adapted to communicate via a packet-switched part of the telecommunications network is to be selected as the given communication client.

21. A computer program product comprising a non-transitory computer-readable storage medium having computer readable instructions stored thereon, the computer readable instructions being executable by a computerized device to cause the computerized device to perform a method for initiating a voice call via a dialler user interface on a user device in a telecommunications network, the user device comprising at least a first communication client adapted to communicate via a first part of the telecommunications network and a second communication client adapted to communicate via a second, different part of the telecommunications network, the method comprising, at the user device:
- receiving, via the dialler user interface of the user device, user input from a user of the device associated with initiating setup of a communication session;
- selecting a given one of the first and second communication clients to pass the user input to for processing, whereby a communication session setup request is transmitted from the given communication client into the respective part of the telecommunications network; and
- determining which of the first and second communication clients is selected as the given communication client at least in part on the basis of one or more predetermined criteria, wherein the one or more predetermined criteria comprise a default criterion that a Voice over Internet Protocol (VoIP) communication client adapted to communicate via a packet-switched part of the telecommunications network is to be selected as the given communication client.

22. A method of initiating a voice call via a dialler user interface on a user device in a telecommunications network, the user device comprising at least a first communication client adapted to communicate via a first part of the telecommunications network and a second communication client adapted to communicate via a second, different part of the telecommunications network, the method comprising, at the user device:
- receiving, via the dialler user interface of the user device, user input from a user of the device associated with initiating setup of a communication session;
- selecting a given one of the first and second communication clients to pass the user input to for processing, whereby a communication session setup request is transmitted from the given communication client into the respective part of the telecommunications network;
- determining which of the first and second communication clients comprises the given communication client at least in part on the basis of media connectivity quality estimate data associated with current media connectivity quality of one or more of the first and second communication clients; and
- determining the media connectivity quality estimate data by conducting one or more media test communication sessions via one or more of the first and second communication clients, wherein a media test communication session conducted via a Voice over Internet Protocol (VoIP) communication client is initiated by transmittal of a SIP INVITE message containing an Alert-Info header with a 'Loopback' parameter into a packet-switched part of the telecommunications network.

* * * * *